US006310609B1

(12) United States Patent
Morgenthaler (10) Patent No.: US 6,310,609 B1
(45) Date of Patent: Oct. 30, 2001

(54) USER INTERFACE WITH GUIDE LIGHTS

(75) Inventor: Angela Morgenthaler, San Diego, CA (US)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 08/843,953

(22) Filed: Apr. 17, 1997

(51) Int. Cl.[7] .................................................. H04M 1/00
(52) U.S. Cl. ............................ 345/170; 345/169; 341/22; 379/368; 379/433
(58) Field of Search ................................... 345/169, 170; 379/368, 433; 341/22

(56) References Cited

U.S. PATENT DOCUMENTS

| 3,693,492 | | 9/1972 | Ohno ........................................ 84/436 |
| 3,842,708 | | 10/1974 | Leonard .................................. 84/485 |
| 4,349,705 | * | 9/1982 | Kuhfus .................................... 379/368 |
| 4,453,062 | * | 6/1984 | Brown et al. ........................... 379/368 |
| 4,491,692 | * | 1/1985 | Lee ......................................... 379/368 |
| 5,235,636 | * | 8/1993 | Takagi et al. .......................... 379/368 |
| 5,237,607 | * | 8/1993 | Diamantis ............................... 379/368 |
| 5,247,700 | * | 9/1993 | Wohl et al. ............................. 455/552 |
| 5,425,077 | | 6/1995 | Tsoi ........................................ 379/58 |
| 5,426,732 | | 6/1995 | Boies et al. ............................ 395/161 |
| 5,442,687 | | 8/1995 | Miller ..................................... 379/100 |
| 5,442,746 | | 8/1995 | Barrett ................................... 395/161 |
| 5,486,846 | | 1/1996 | Comer et al. .......................... 345/168 |
| 5,598,469 | * | 1/1997 | Preker .................................... 379/368 |
| 5,999,827 | * | 12/1999 | Sudo et al. ............................. 345/169 |
| 6,046,730 | * | 4/2000 | Bowen et al. ......................... 345/168 |

FOREIGN PATENT DOCUMENTS 2-105112 * 10/1988 (JP) .

\* cited by examiner

*Primary Examiner*—Bipin Shalwala
*Assistant Examiner*—Vincent E. Kovalick
(74) *Attorney, Agent, or Firm*—Dana, Jubin, Patel, Milan; Brown Martin Haller & McClain (57) ABSTRACT

A user interface with guide lights for a communications device, such as a mobile telephone, is provided to assist a user in the correct and efficient operation of the device having a display, and a keypad which contains a numerical 10-key and other control keys. The user interface includes a means for identifying the appropriate keys on the keypad which correspond to the step or steps required to activate a desired operation to be performed within the device. In the preferred embodiment, identification of the appropriate keys is achieved using a light source which is mounted beneath each translucent key so that when the light source is illuminated, the key associated with that light source will be identified to the user. The intensity of the light sources is variable and may be controlled to provide sufficient contrast to read all keys in low ambient light while highlighting the keys to be pressed for operation of the desired function. In high ambient light, the intensity of the guide lights may be increased for enhanced contrast and visibility. Alternatively, different color light sources may be used, with one color to light all keys for visibility in low ambient light, if needed, and the other color to provide the guide lights.

20 Claims, 6 Drawing Sheets

USER INTERFACE WITH GUIDE LIGHTS

FIELD OF THE INVENTION

This invention relates generally to devices having manually operated push-buttons as part of a user interface, and more particularly to wireless communications units having a user interface which aids the user in operating the unit.

BACKGROUND OF THE INVENTION

Typical mobile telephone units, both cellular and PCS, include a keypad and an LCD display for the user interface. The user of the mobile unit controls the operation of the telephone through the user interface, entering commands, characters, and phone numbers with the keypad. The user then views the commands entered and other information on the display. To facilitate the use of the keypad and display while the mobile telephone is operated in the dark, or in areas having limited ambient light, the display and keypad is often back-lighted.

The size of a mobile phone generally limits the size of the display, which in turn limits the amount of information that can be visually presented on the display at one time. The portion of the face of the telephone that is used for the display varies depending on the type of display and keypad. A common example of a mobile phone configuration has a liquid crystal display (LCD) having one to four lines capable of displaying text, each line having multiple character positions composed of a dot matrix. The dot matrix can also be used to display graphic images. A portion of the remaining area of the phone is occupied by the keypad. The keypad contains an array of individual push-buttons, or "keys", which are used for either a fixed function or a soft function. A fixed function key has a single function, regardless of the actual configuration or status of the telephone. A soft function key is a key which is dynamically assigned a variety of functions from a pre-determined set of functions. Most fixed function keys will have some type of lettering or symbology which indicates its function. A soft function is usually marked to identify its dynamic functionality.

An example of a mobile phone having a display and keypad configuration is disclosed in U.S. Pat. No. 5,425,077 of Tsoi (issued on Jun. 12, 1995) for an invention entitled "Mobile Telephone User Interface Including Fixed and Dynamic Function Keys and Method of Using Same." In the configuration disclosed by Tsoi, much of the front surface of the telephone is used for the display, and the control of the telephone is achieved using an array of soft-function keys.

Figure 1:
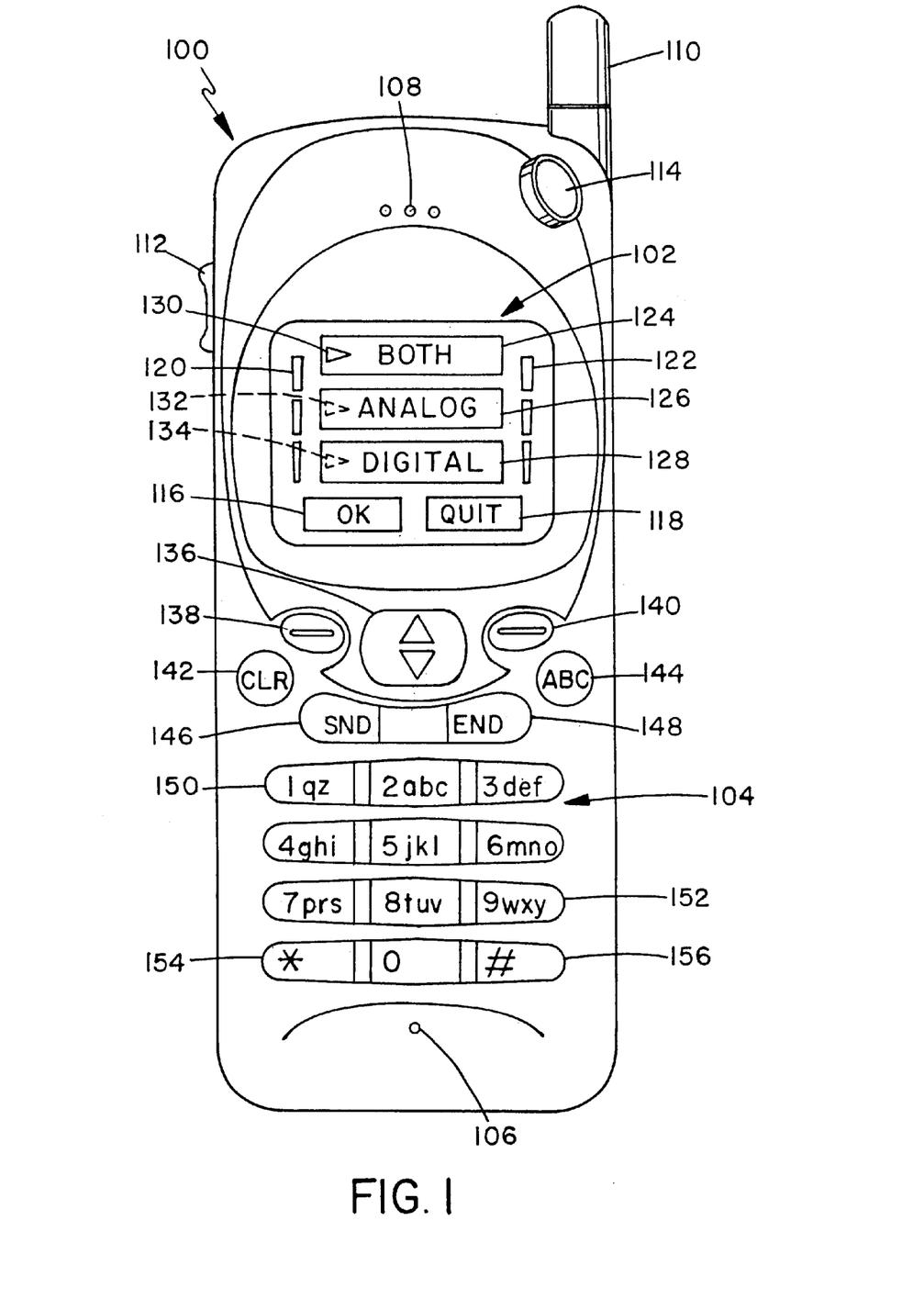
FIG. 1 is a front plan view of a prior art telephone showing the display and keypad which includes a number of fixed-function keys and a couple of soft-function keys.

FIG. 1 illustrates another example of a prior art telephone display and keypad configuration commercially known as the Nokia Model 2120. Referring to FIG. 1, the prior art telephone is shown and generally designated 100. Telephone 100 includes display 102, keypad 104, microphone 106, speaker 108, antenna 110, a speaker volume adjustment 112. The telephone is turned on by pressing ON/OFF button 114, which provides power to the telephone which in turn runs through its power-on testing sequence. Once the testing sequence has been completed, the telephone is ready for use.

Display 102 is formed with textual display areas 116, 118, 124, 126, 128 and graphical display areas 120, 122. In addition, cursor 130 is provided to allow the user to identify any selection from the menu by moving the cursor 130 from its initial position to alternative positions 132 and 134 within display 102. Graphical display areas 120 and 122 are used to provide easy identification of the remaining battery life and the radio frequency signal strength.

The keypad 104 includes a pair of soft keys 138 and 140, and a cursor movement key, or indexing key, 136. These three keys 136, 138, and 140 allow the user to move through the complicated menu scheme by pressing soft key 140 to select the menu, then moving the cursor 130 within that menu using the indexing key 136 and selecting a particular menu entry by pressing the other soft key 138. Keypad 104 also has the standard 10-key alpha-numeric keys such as keys 150, 152, 154, and 156, with the ABC, or alpha, key 144 allowing the user to enter alphanumeric characters. Also, a CLR key 142 is provided for correction of an erroneously entered key or command. A telephone number may be entered and SND key 146 is pressed to initiate a telephone call, and END key 148 is pressed to terminate the call.

Display 102 of telephone 100 shows a menu selection of the mode of the telephone, including an ANALOG mode shown in display area 126, a DIGITAL mode shown in display area 128, and a BOTH mode which incorporates both the analog and digital modes shown in display area 124. In making the mode selection, cursor 130 may be moved from its original position to alternative positions 132 or 134 using indexing key 136. Once the cursor is positioned within the desired display area, such as display area 124, soft key 138 which corresponds to display area 116, currently showing the word "OK", is pressed thereby selecting the "BOTH" mode. Navigation through the various menu commands is often difficult, particularly when there are several levels of menu options in a nested, or hierarchical configuration. While it is possible to successfully operate the telephone using the written manual as a guide, this method of operation if often frustrating and time consuming.

The prior art telephone includes a number of fixed function keys and soft function keys. The fixed function keys are labeled descriptively with their respective functions, such as "SND" for sending a signal, "CLR" for clearing an input signal, and "PWR" for controlling the power to the telephone. The soft function keys are labeled with numbers, letters, or both since their function will be dynamic. In the Nokia telephone, most keys are made from material that is at least partially translucent so that lighting from the underside of the key will pass through to the top side and back light the labeling or marking on the upper surface of the key. Alternatively, the keys can be opaque, with the light being transmitted through the spaces between a key and the face plate, creating a halo around the key. Aside from simultaneous illumination of the markings on all keys, there is no functional information presented by or within the keypad area since most mobile phones typically provide indications of the functions, status or state of the telephone only within the display portion of the telephone.

A data processor, such as a microprocessor, is commonly used to process the inputs from the keypad and generate character or graphic information that is output on the display. This microprocessor is programmed to implement a particular menu structure within which the user can select functions, parameters or modes from a hierarchy of options. To select an option, the user will press a key to present the first level of menu options on the display, for example, a "menu" key. The user then views the available selections in the first level of options by pressing a key, for example, a "scroll" key, or an "up" and "down" key, causing a series of menu options to be sequentially displayed on the display. The option can then be selected by pressing another key, for example, a "store" key or "select" key. Many selection options will have a second level from which the user may choose. For example, a first level menu option selection of "ring volume" would lead to a second level selection wherein the user selects the ring volume desired from a list of ring volumes, for example, from the choices "1," "2," "3," "4" and "5."

Another example of a menu function is "keyguard" which, when activated, partially disables the keypad to prevent inadvertent key-presses from initiating any action or needlessly filling the display with numbers. In order to deactivate the "keyguard" function, the user presses a certain sequence of keys, for example the "menu" key followed by the "*" (star) key.

Due to the large number of menu options and specific key sequences necessary for performing the many functions available in the modern mobile phones, users frequently have difficulty determining which keys need to be pressed in order to achieve the desired operation. In some cases, the display will instruct as to which key should be pressed, but in other cases, there is no such instruction provided. Where no instruction is provided, the user must experiment and possibly initiate an action that was not intended, or refer to complicated and lengthy written instructions for operation of the phone. This may result in frustration to the user, or an inadvertent action being initiated at a cost to the user.

In addition to the failure of existing user interfaces to assist the user of the telephone in its proper operation, the difficulty increases when a phone user attempts to operate the telephone in the dark because the keypad is rarely lighted in a manner which will allow the user to view all keys which are available. Moreover, even if all keys are available, the user must still determine which key provides the appropriate response to a menu selection or other function of the telephone.

In view of the failure of existing user interfaces to provide for easy access to keypad-activated functions in mobile telephone, an improved user interface is needed to facilitate the quick, reliable, and more accurate operation of the phone.

SUMMARY OF THE INVENTION

It is an advantage of the present invention to provide a user interface for a telephone which guides the user through the operation of the telephone.

It is another advantage of the present invention to provide a user interface for a telephone which provides a series of visual cues to assist the user in the operation of the telephone.

Yet another advantage of the present invention is to provide a user interface which significantly reduces instances in which a user of a telephone must refer to the operation or user's manual in order to properly operate the telephone.

In an exemplary embodiment of the present invention, a user interface is provided which facilitates a user in the correct and efficient operation of a telephone having a display, and a keypad which contains ten numerical keys and other control keys. The user interface includes a means for visually identifying the appropriate keys on the keypad which enable a particular command to be performed within the telephone. This means for visually identifying the appropriate keys includes a light source which is mounted beneath each of the translucent keys so that when the light source is illuminated, the key associated with that light source will be illuminated for easy identification by the user. In an alternative embodiment of the present invention, the light source may be a light bulb, or light emitting diode (LED) which is positioned within the key, or adjacent the key, such that the light source is easily visible by the user of the telephone. The light sources may emit colored or white light, however, for enhanced contrast and visibility in high ambient light conditions, colored light may be preferred.

To facilitate operation of the telephone during the day, or in other bright ambient light, the key light sources are brighter so that sufficient contrast is provided that the keys can be readily identified while operating the telephone. The guide lights need not be as bright when the telephone is used in low or no ambient light, such as at night or in a dimly lit room. When the telephone is operated in low, or no ambient light, a brightness differential is created so that valid "next" keys are brighter than non-valid "next" keys, with a minimal amount of light being provided for all keys. "Next" keys are defined as one or more keys on the keypad which are appropriate keypad entries for the current menu or command sequence which is being performed. Thus, the brightness differential allows the user to easily identify which keys should be pressed to enable the desired function, while still providing enough light to see the entire keypad.

As an alternative means for providing contrast, different color light sources may be used, for example, red and green LEDs, or color filters may be positioned over white light-emitting LEDs.

To ensure the longevity of the battery which powers the telephone, a timer may be provided which will monitor the length of time the user interface lights the keypad. After the keypad has been illuminated for what is considered a sufficient period of time to assist the user in making menu selections, the illumination is deactivated to save battery power. A light sensor may be provided which allows the user interface to adjust the intensity of the illumination when the telephone is being used in low or no ambient light, thereby extending the life of the battery within the telephone while still providing enough power to enable the brighter illumination needed for use in high ambient light.

BRIEF DESCRIPTION OF THE DRAWINGS

Understanding of the present invention will be facilitated by consideration of the following detailed description of preferred embodiments of the present invention taken in conjunction with the accompanying drawings, in which like numerals refer to like parts, and in which.

DETAILED DESCRIPTION OF A PREFERRED EMBODIMENT

Figure 2:
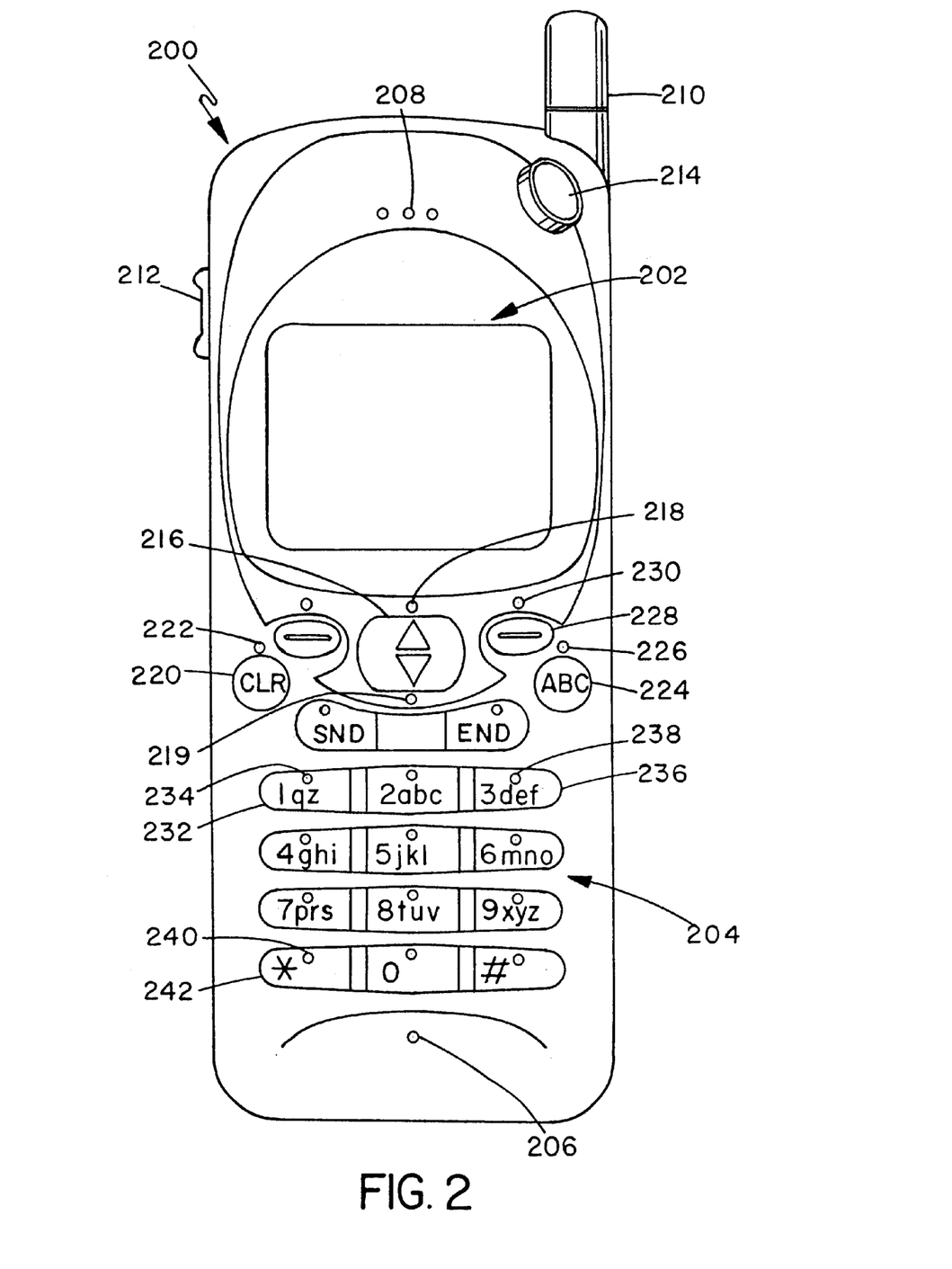
FIG. 2 is a front plan view of a telephone of the present invention showing a display and a keypad equipped with a light source adjacent each key to uniquely identify each key in order to guide the user in the operation of the telephone.

Referring to FIG. 2, a telephone handset incorporating the user interface of the present invention is shown and generally designated 200. Telephone 200 is similar in appearance to prior art telephone 100 of FIG. 1 including display 202, keypad 204, microphone 206, speaker 208, antenna 210, and speaker volume control 212. Keypad 204 contains the same keys which were shown in FIG. 1, however, possesses the improvement comprising the addition of a separate light source associated with each key. The light sources may be miniature light bulbs, LEDs (light emitting diodes), or low power semiconductor lasers, e.g., surface emitting lasers. To provide an example, soft key 228 is provided with a light source 230 adjacent the key to uniquely identify the soft key 228 when the light source 230 is lighted. The indexing key 216 is a toggle switch and can be pressed either at its top or bottom. Key 216 is provided with two light sources 218 and 219 to indicate that it may be pressed in either the up direction, as indicated by light source 218, or in the down direction as indicated by the light source 219. Each numerical key is also equipped with at least one light source, such as the light source 234 associated with the "1" key 232, the light source 238 associated with the "3" key 236, and the light source 240 associated with the "*" key 242.

Two separate light sources may be provided for each key, with each of these light sources emitting different color light. As an illustration, LEDs having dimensions on the order of 4 mm or less would make it possible to position two such LEDs behind a key which is approximately 8 mm wide. The different color LEDs could be selectively illuminated—one color for general visibility in low ambient light, the other providing the guide light.

By selectively illuminating one or more of the light sources, the associated key will be identified to the user. By illuminating only those keys which provide valid responses for any given operation, the operator is guided through the proper operation of the telephone without referring to the written manual or user's guide. Moreover, by identifying the proper keys to accomplish a particular menu command sequence, the user may more quickly complete the menu selection and is less likely to initiate an undesired command by pressing a wrong key.

Figure 3:
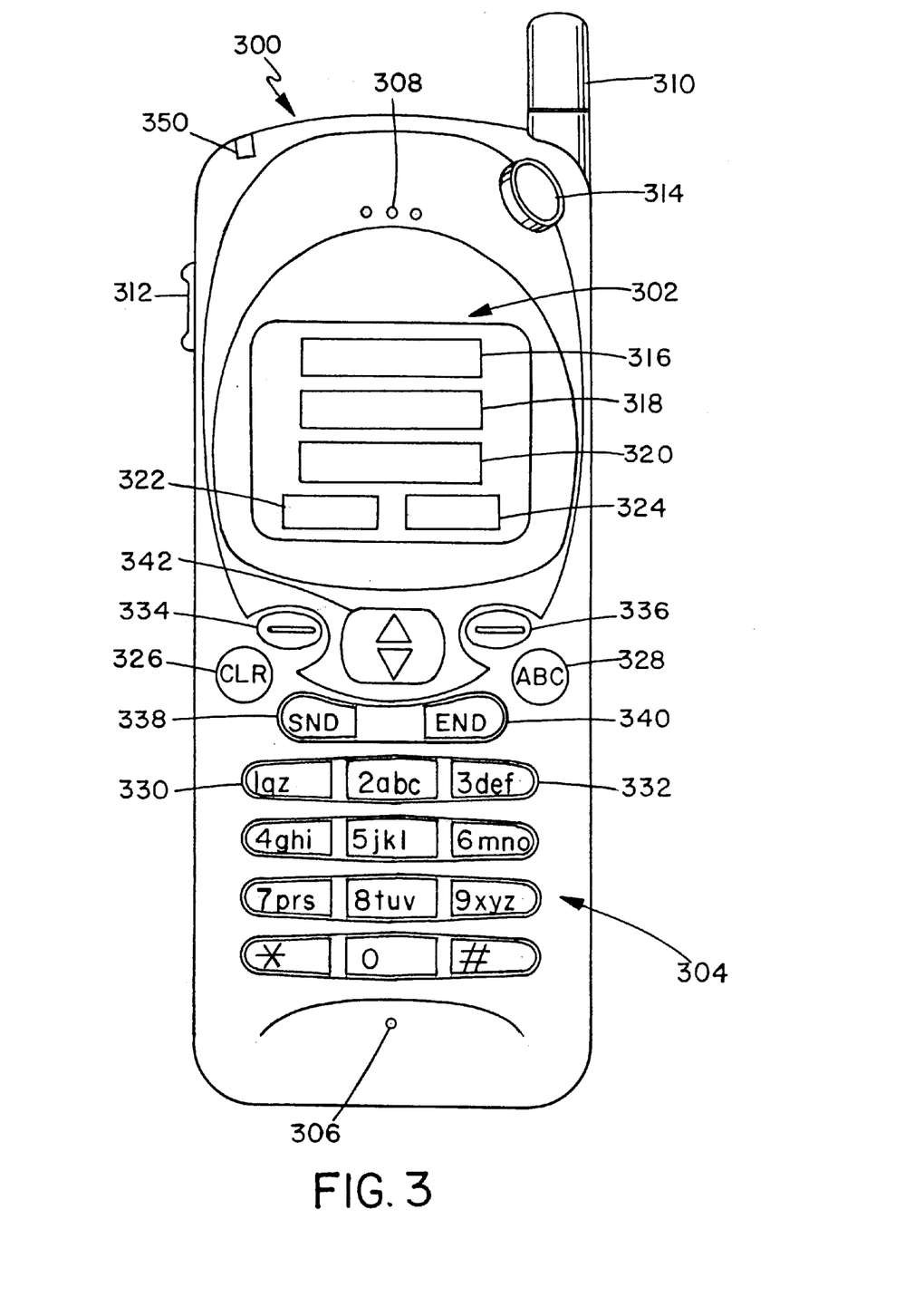
FIG. 3 is a front plan view of an alternative embodiment of a telephone of the present invention showing a display and a keypad which is equipped with a light source beneath, or embedded within, each key to uniquely identify each key in order to guide the user in the operation of the telephone.

Referring now to FIG. 3, an alternative embodiment of the present invention is included in a telephone and is generally designated 300. Telephone 300 includes display 302, and keypad 304. Display 302 is similar to the display shown and described in conjunction with telephone 100 of FIG. 1, and includes display areas 316, 318, 320, 322, and 324 which display relevant information relating to the status of the telephone. Graphical display information (not shown) may also be shown in display 302.

Keypad 304 includes a number of keys which are made from a translucent material which allows light from one or more light source (not shown) located beneath the key to transmit light up through the key. This back lighting of the key provides for the unique identification of each key by selectively activating the light source(s) beneath the key.

Figure 4:
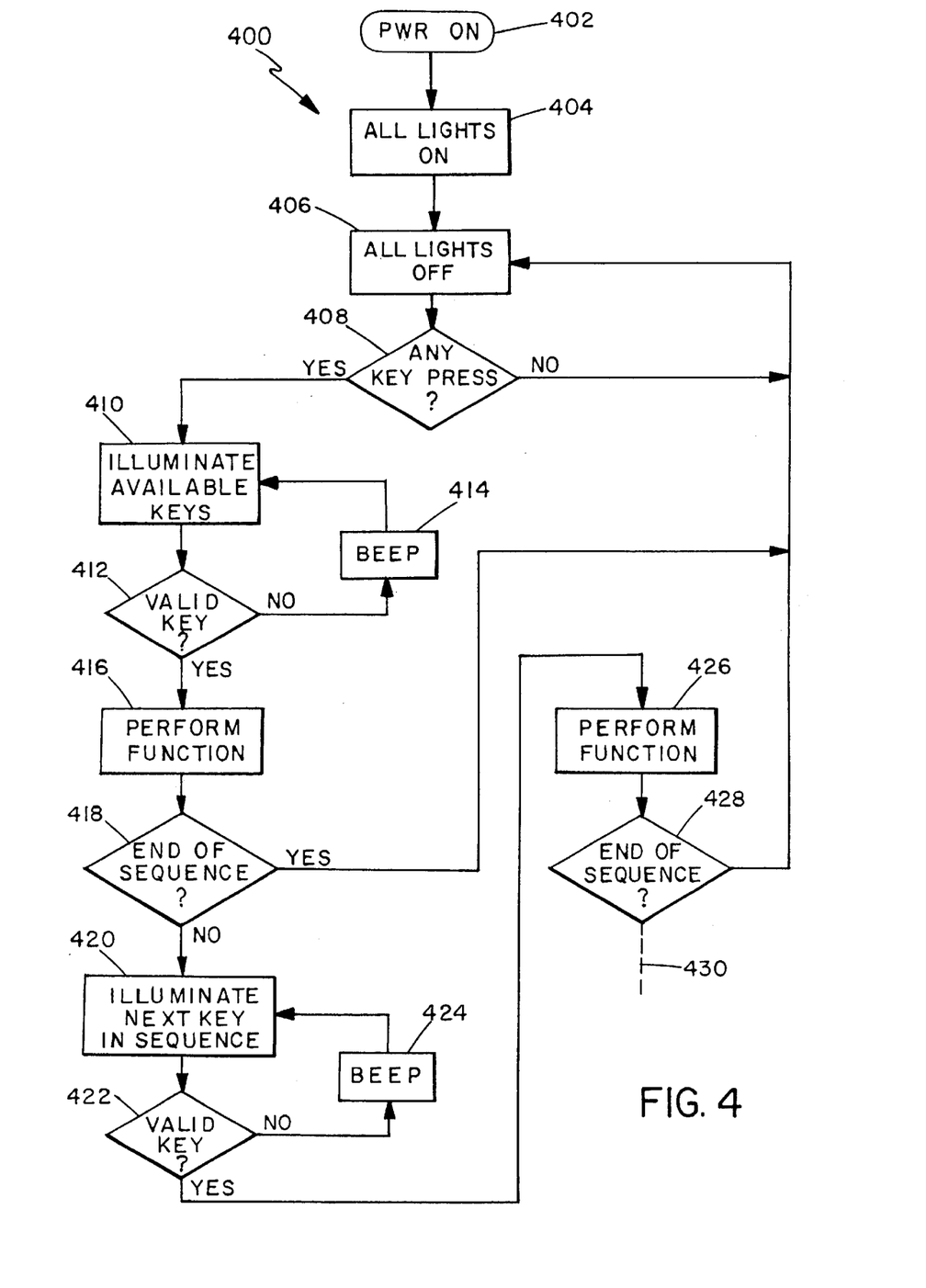
FIG. 4 is a flow diagram showing the process steps which are representative of the user interface facilitating the user's implementation of a typical menu command structure contemplated in the present invention.
Figure 5A:
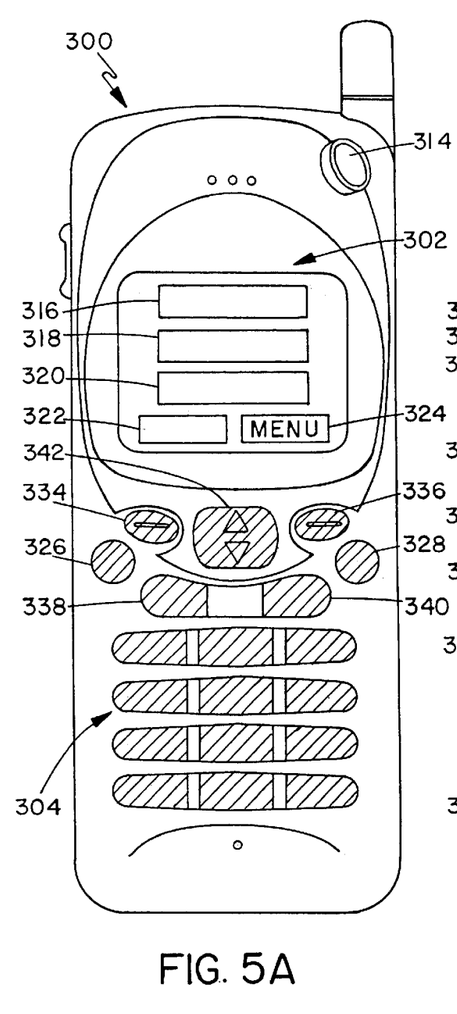
FIG. 5A is a front plan view of a telephone embodying the user interface of the present invention, showing the user interface of the present invention, showing the "MENU" softkey position by illuminating only the appropriate softkey to identify the correct key to the user.

In operation, the user interface of the present invention will guide operation of the telephone by selectively illuminating only the keys which would be an appropriate response, or "next" key in a sequence for a particular operation. Referring to FIG. 4, a flow chart detailing the operation of an exemplary menu command sequence is shown and generally designated 400. Flow chart 400 correlates generally to FIGS. 5A through 5D, showing the steps performed on telephone 300, and begins with the powering on of the telephone in step 402. Immediately upon powering on the telephone 300, all lights are momentarily illuminated to provide the user with a quick view of the available keys, as well as to provide a visible system check to verify the proper operation of all light sources. Following the initial power-on sequence, all lights are turned off in step 404, and the user interface awaits the depression of any key in step 408. FIG. 5A shows telephone 300 with all light sources off, as indicated by the cross-hatching on the keys within the keypad 304. If no keys are pressed, the lights remain off, as shown in step 406. However, in the event a key is pressed by the user, the user interface illuminates the available keys in step 410 such that the user may easily identify the keys which will perform a valid function.

As shown in FIG. 5A, once a key has been pressed, soft key 336 and SND key 338 are illuminated to indicate that a menu selection may be made, or the SND key can be pressed to redial the last number called. In addition to SND key 338 and soft key 336, the numeral keys may also be illuminated to identify that the user may simply enter a telephone number to initiate a call. Since entry of a phone number would already be within the capability of the user, such steps have been omitted from this discussion.

Figure 5B:
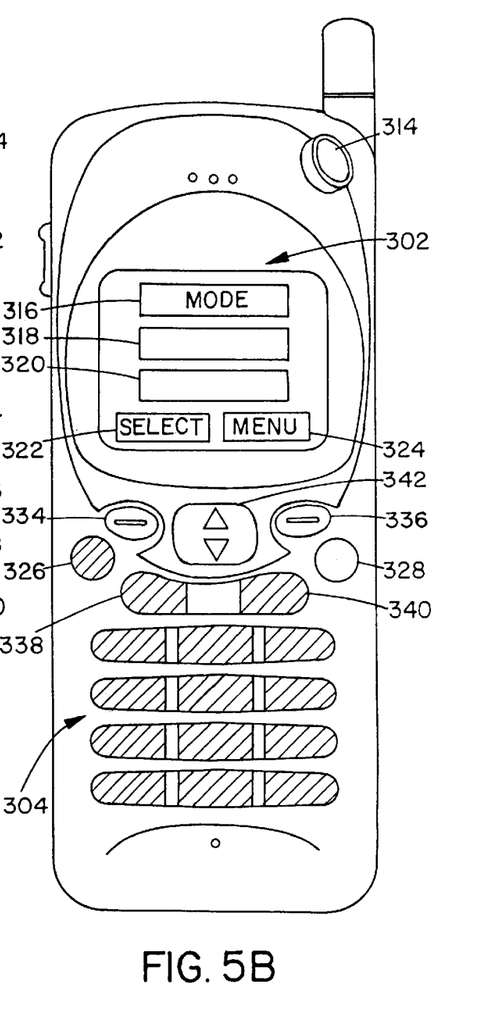
FIG. 5B is a view of the telephone as in FIG. 5A, showing the "MENU" selected in the display, and the appropriate up/down, menu, and select keys being illuminated in order to identify to the user that the identified keys are the proper keys to press.

Once the user has turned on the telephone 300, or pressed any key on the telephone, and all keys have been momentarily illuminated, the available keys have been identified, such as SND key 338 and soft key 338, the user may then press another key, which is monitored in step 412. In the event that the user presses an incorrect key, or a key which will not perform any available function, the user interface may provide a cue, such as an audible "beep" as shown in step 414, and return to the illumination of the available keys in step 410. When the user presses an appropriate key selected from those which were illuminated, the user interface performs the desired function which was selected by the user. For example, if, following the power on sequence of the telephone, the user presses soft key 336 which identifies the MENU in display area 324, the user interface will then display the menu options as shown in FIG. 5B. In accordance with the menu options which are displayed in display area 316, with further options being shown in display areas 322 and 324, the keys which correspond to valid "next" keys are then illuminated. Specifically, soft key 334 is illuminated and corresponds to the "SELECT" option shown in display area 322, and soft key 336 is illuminated and corresponds to the "MENU" options shown in display area 324. Also, indexing key 342 is illuminated such that the first level of a multi-level command menu may be browsed simply by pressing the indexing key on its upper or lower edge to scroll the command menu either upwards or downwards in display 302. In order to provide the user with additional information regarding the user's current position within the menu, indexing key 342 may be equipped with two light sources, one located near the upper edge of the key, and the other located near the lower edge of the key. When the user reaches the upper end of the menu, the upper light source is no longer illuminated, and when the user reaches the lower end of the menu, the lower light source is no longer illuminated. As a result, the user can easily identify if they are at the top of the command menu, at the bottom of the command menu, or somewhere in the middle.

In addition to the soft keys being illuminated, the "ABC" key 328, which places the telephone in a alpha character-entering mode, is illuminated. This indicates to the user that they may simply press key 328 to enter the textual command that they wish, without having to pass through the entire menu. If the "ABC" key 328 was pressed, the keys on the lower portion of the keypad, corresponding to the numerals 1 through 0 and the characters * and #, will be illuminated to allow the user to simply enter in the command they wish to be executed.

Once the function which was selected by the user has been performed in step 416, the user interface verifies whether there are any additional menu selections or data inputs which need to be made to accomplish the selected command. If the command sequence has been completed as determined in step 418, the user interface returns to step 406, terminating the illumination of the keypad. However, if there is yet another selection to be made to accomplish a given command sequence, the user interface illuminates the appropriate keys for the next command selection, as shown in step 420.

Figure 5C:
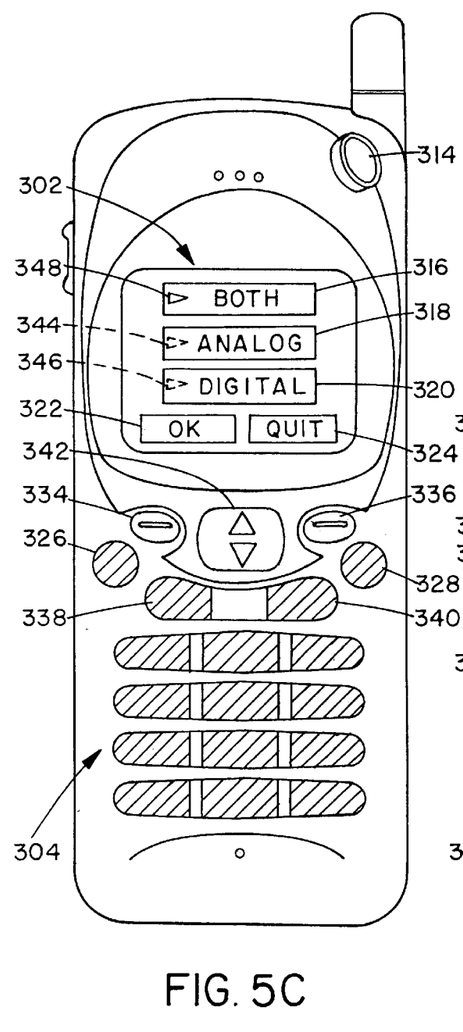
FIG. 5C is a view of the telephone as in FIG. 5B, showing the menu options for an ANALOG, DIGITAL, or BOTH function selection, and the softkeys which can be used to SELECT, or OK, the menu option, or the softkey which allows the user to QUIT the process and return to the original operation of the telephone.

FIG. 5B shows the telephone 300 having the MODE menu command in display area 316, corresponding to step 410. If the soft key 334 which corresponds to the SELECT option is pressed, the telephone will enter the MODE selection command, as shown in step 416. Because the MODE command requires more information, the user interface illuminates the appropriate keys corresponding to valid next keys, as shown in step 420. FIG. 5C shows the display for the MODE command, and includes a selection between an ANALOG mode shown in display area 318, a DIGITAL mode shown in display area 320, or a dual mode indicated by BOTH in display area 316. To facilitate selection of the proper mode, the user interface selectively illuminates the keys corresponding to appropriate next keys. For example, the indexing key 342 is illuminated to guide the user in the movement of the selection cursor 348 between its initial position near display area 316, and alternative positions 344 and 346 corresponding to display areas 318 and 320, respectively. By repeatedly depressing the upper or lower portion of the indexing key 342, or holding the appropriate half of the key in a depressed position, cursor 348 moves up or down to select the ANALOG, DIGITAL or BOTH mode of operation for the telephone.

Figure 5D:
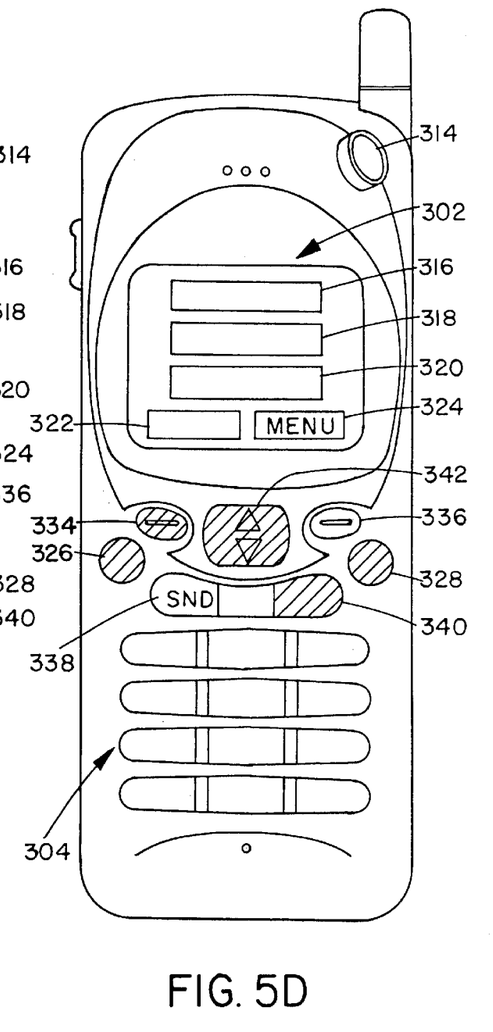
FIG. 5D is a view of the telephone as in FIG. 5C, showing the display having been returned to initial state and ready for another menu selection.

Once the user has positioned the cursor adjacent the desired mode of operation for the telephone, the user then presses the illuminated soft key associated with either the OK in display area 322, or the QUIT in display area 324. Again, if the user presses an incorrect key as determined in step 422, the user interface will provide an audible "beep" in step 424 to indicate an incorrect keypress, and will return to step 420 illuminating the available keys. If the user presses soft key 334 which corresponds to the OK in display area 322, the user interface implements the mode selection which the user has chosen, as shown in step 426. Or, if the user presses soft key 336 which corresponds to the QUIT in display area 324, the user interface abandons the menu selection and returns to its initial power-on state. Assuming that the user has pressed the soft key 334 corresponding to the OK in display area 322, the user interface terminates the illumination of any keys, as shown in step 406, and in FIG. 5D. FIG. 5D also shows that, instead of turning all lights off following the menu command sequence, the numerical portion of the keypad may be illuminated to indicate that a phone number may be entered at that time. Also, such illumination may be timed, providing only a short interval of illumination, thereby effectively guiding the user while still maximizing the life of the battery.

Once the user has made the appropriate key selection in step 422, and the user interface has performed the function in step 426, such as implementing the desired mode of operation for the telephone, the user interface determines whether additional information is needed from the user in step 428. If no other information is needed, the user interface returns to the original power-on state. If additional information is needed from the user, the user interface will continue with the process as indicated by line 430, and will continue with the command sequence and selective illumination of the keypad until the command sequence has been completed.

The MODE selection command which has been described in detail herein is merely an example of the type of guidance which the user interface of the present invention can provide. The user interface of the present invention may be used to assist the user in a variety of other operations of the telephone, such as illuminating the proper keys for entering telephone numbers into memory locations within the telephone, and illumination of the SND key for answering an incoming call.

The method for the identification of the keys of the present invention has been described to include a light source adjacent the keys, or alternatively, a light source located beneath a translucent key. However, it should be understood that any identification method which uniquely identifies a key or a selection of keys is contemplated herein. Such alternative identification methods, for example, could include an illumination device such as a light, a tactile device such as a vibrating key, or any other means of identification of one or more of the keys on the keypad.

If a user is sufficiently familiar with the telephone 300 that he or she no longer requires guidance by the user interface of the present invention, the user interface may be disabled. Such disabling may be achieved simply by entering a command sequence such as those described above. The option to disable the user interface with guide lights of the present invention will provide for a longer battery life.

The selective illumination of the keys is controlled by a microprocessor, or other data processor (not shown). This processor is contained within the telephone and may be incorporated into the processor which controls the full operation of the telephone, or may be implemented in a dedicated user interface processor. In either case, the user interface of the present invention will provide perceivable signals which guide the user in the proper operation of the telephone, such as the selective illumination of the keys which would be appropriate inputs for the current operation of the telephone. Implementation of the user interface guide with lights may be accomplished in software, as is known in the art. Such implementation, for example, would include the addition of an illumination control process to the general operation of the telephone.

A light sensor 350 may also be included in telephone 300 to facilitate the determination of the necessary intensity of the light sources. Light sensor 350 would detect the ambient light level and provide the information to the data processor within the telephone. Upon receiving information from the light sensor that the telephone is being operated in low or no ambient light, the user interface would lower the intensity of the illumination to minimize battery drain and still allow for the user to distinguish between the guide lighting and the general background key lighting. If, on the other hand, the information provided from the light sensor 350 to the data processor indicates the telephone is being operated in high ambient light, the user interface would increase the intensity of the illumination to provide the contrast needed to distinguish between lit and unlit keys. An exemplary light sensor is a cadmium-sulfide photodetector, but any other passive resistive photosensor or active photosensor could be used. Other light sensors are well known in the art, and are not described in further detail, but are contemplated fully herein.

For an embodiment using two-color light sources, the light sensor function could determine when general background illumination of the keys is needed, i.e., in low ambient light. If necessary, depending on the visibility of the guide light color in high ambient light, it may be desirable to increase the intensity of the guide light.

The present invention has been discussed in conjunction with mobile telephones. However, it should be understood that the user interface with guide lights of the present invention may be implemented in a variety of other devices. Such devices could include for example, wireless communicators, which include functions of Internet access, facsimile transmission and electronic mail in addition to being a mobile telephone, wire-based telephones and other devices having a keypad which directs an internal command sequence.

Other embodiments and modifications of the present invention will occur readily to those skilled in the art in view of these teachings. Therefore, this invention is to be limited only by the following claims, which include other embodiments and modifications when viewed in conjunction with the above specification and accompanying drawings.

I claim:

1. A user interface for assisting a user in the operation of a telephone, said telephone having a display and a keypad having a plurality of keys, each said key corresponding to a particular operation of said telephone, said user interface comprising:

a plurality of illumination sources, wherein at least one illumination source of said plurality of illumination sources corresponds to each key of said plurality of keys to uniquely identify said key by selectively illuminating the corresponding illumination source;

a means for independently controlling activation of said plurality of illumination sources to identify one or more of said plurality of keys in order to guide said user in the proper operation of the telephone;

means for identifying when the user presses a non-illuminated key to alert the user of an error due to pressing the non-illuminated key; and a timer, said timer being electrically connected to said data processor for providing a timing signal of a predetermined duration signaling said data processor to deactivate said illumination sources.

2. The user interface of claim 1, wherein each key is at least partially light transmissive and at least one illumination source is disposed beneath its corresponding said each key thereby illuminating said each key when said at least one illumination source is activated.

3. The user interface of claim 1, wherein said at least one illumination source is disposed adjacent each said key, thereby identifying one said key when its respective said illumination source is activated.

4. The user interface of claim 1, wherein said at least one illumination sources is disposed within said each key, thereby identifying one said key when its respective illumination source is activated.

5. The user interface of claim 1, wherein said each key has two illumination sources corresponding thereto, each of said two illumination sources emitting light of a different color.

6. The user interface of claim 1, wherein said means for controlling said illumination sources comprises a data processor.

7. The user interface of claim 1, wherein each of said plurality of illumination sources having an illumination contrast level and further comprising a light sensor for monitoring an ambient light and for providing a signal to said controlling means wherein said controlling means varies said illumination contrast level of said plurality of illumination sources responsive to the ambient light.

8. The user interface of claim 1, wherein said means for controlling said plurality of illumination sources includes a disabling means temporarily disabling said plurality of illumination sources.

9. A user interface for assisting a user in the operation of a telephone, said telephone having a display and a keypad having a plurality of keys, each key corresponding to a particular operation of said telephone, said user interface comprising:

a plurality of identifiers, wherein at least one identifier of said plurality of identifiers is associated with each key of said plurality of keys to uniquely identify said one key and wherein any one of said plurality of identifiers may be selectively activated;

a means for controlling said plurality of identifiers to identify one or more of said plurality of keys to said user to provide a guide for said user;

a means for identifying an error of pressing a non-illuminated key by the user; and a means for alerting the user of the error.

10. The user interface of claim 9, wherein said plurality of identifiers comprises a plurality of light sources for backlighting said plurality of keys.

11. The user interface of claim 10, wherein each light source of said plurality of light sources comprises a light emitting diode.

12. The user interface of claim 10, wherein said controlling means includes means for enhancing a contrast of each light source in response to an ambient light level.

13. The user interface of claim 12, wherein said enhancing means comprises means for varying an intensity of each light source.

14. The user interface of claim 12, wherein each key has two light sources of said plurality of light sources corresponding thereto, said two light sources emitting a different color light and said means for enhancing contrast comprised means for selecting one of said two light sources.

15. A method for guiding a user in the operation of a telephone, said telephone having a display, a keypad having a plurality of keys, each key having a unique function and having a selectively activatable illumination source, said method for guiding comprising the steps of:

storing a plurality of functions in a function menu, each function of the plurality of functions having at least one keystroke on said plurality of keys associated therewith;

detecting selection of a desired function from said function menu;

selectively illuminating at least one of said illumination sources of said keys within said keypad to indicate said at least one keystroke for activating the desired function;

identifying an error of pressing a non-illuminated key by said user; and alerting said user of the error.

16. The method of claim 15, wherein the step of selectively illuminating includes varying an illumination contrast based upon an ambient light level.

17. The method of claim 16, wherein the step of varying an illumination contrast comprises varying an intensity of light emitted by said illumination sources.

18. The method of claim 16, wherein each illumination source includes first color light source and second color light source, and the step of varying an illumination contrast comprises selecting one of said first and second color light source.

19. The method of claim 17, wherein the step of varying an illumination level includes detecting the ambient light level.

20. The method for guiding a user of claim 15, wherein the step of alerting said user comprises generating an audible signal.

* * * * *